US011158439B2

(12) United States Patent
Shimizu et al.

(10) Patent No.: US 11,158,439 B2
(45) Date of Patent: Oct. 26, 2021

(54) SHIELDED TWO-CORE ELECTRIC WIRE ROUTING STRUCTURE WHICH CAN BE REROUTED BY BENT-TWISTING THE ELECTRIC WIRE AT A NUMBER OF POINTS PER UNIT LENGTH

(71) Applicant: YAZAKI CORPORATION, Tokyo (JP)

(72) Inventors: Toshiharu Shimizu, Shizuoka (JP); Hiroki Kondo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/506,585

(22) Filed: Jul. 9, 2019

(65) Prior Publication Data

US 2020/0021000 A1 Jan. 16, 2020

(30) Foreign Application Priority Data

Jul. 12, 2018 (JP) .............................. JP2018-132466

(51) Int. Cl.
 *H01B 7/04* (2006.01)
 *H01P 1/00* (2006.01)
 (Continued)

(52) U.S. Cl.
 CPC .............. *H01B 7/04* (2013.01); *H01B 7/0045* (2013.01); *H01B 11/002* (2013.01); *H01P 1/00* (2013.01);
 (Continued)

(58) Field of Classification Search
 CPC ....... H01B 7/0045; H01B 7/04; H01B 11/002
 (Continued)

(56) References Cited

U.S. PATENT DOCUMENTS 3,818,122 A * 6/1974 Luetzow .................. H01B 7/04
 174/86
6,631,559 B2 * 10/2003 Ueno .................... H01B 7/0045
 156/51
(Continued)

FOREIGN PATENT DOCUMENTS

| JP | 2012-133991 A | 7/2012 |
|---|---|---|
| JP | 2015-185527 A | 10/2015 |
| WO | 2012/030366 A1 | 3/2012 |

OTHER PUBLICATIONS

3M: "Go the distance. 3M (TM) SlimLine Twin Axial Cable Assembly (SFF-8654) for SAS and PCIe Applications. A revolutionary bendable, foldable cabling solution ideal for tight spaces and transmitting signals over longer routes."; Feb. 1, 2018 (Feb. 1, 2018); pp. 1-4; XP055832312; URL: https://multimedia.3m.com/mws/media/14251760/3m-slimline-twin-axial-cable-assembly-sff-8654-for-sas-and-pcie-applications.pdf.
(Continued)

*Primary Examiner* — Benny T Lee
(74) *Attorney, Agent, or Firm* — Kenealy Vaidya LLP

(57) ABSTRACT

A routing structure of a two-core parallel shielded electric wire includes:
 two insulated electric wires that are arranged in parallel; and
 a shield layer that is attached around the two insulated electric wires and extends in a longitudinal direction of the two insulated electric wires.
In the routing structure, the two-core parallel shielded electric wire is rerouted by bent twisting the two-core parallel shielded electric wire in a short axis direction at a route change point along a long axis direction of the two-core parallel shielded electric wire, and the number of bent twisted points in the short axis direction is 1.43 or less per meter.

4 Claims, 7 Drawing Sheets

(51) Int. Cl.
  *H01P 3/02* (2006.01)
  *H01B 11/00* (2006.01)
  *H01B 7/00* (2006.01)
  B60R 16/02 (2006.01)
  B60R 16/023 (2006.01)
(52) U.S. Cl.
  CPC .............. *H01P 3/02* (2013.01); *B60R 16/023* (2013.01); *B60R 16/0215* (2013.01)
(58) Field of Classification Search
  USPC ....................................................... 333/1, 236
  See application file for complete search history.

(56) References Cited

U.S. PATENT DOCUMENTS

| | | |
|---|---|---|
| 2006/0172588 A1 | 8/2006 | Peng |
| 2012/0152589 A1 | 6/2012 | Kumakura et al. |
| 2019/0263338 A1* | 8/2019 | Wang ........................ H01B 7/08 |

OTHER PUBLICATIONS

3M: "3M (TM) Twin Axial Cable Assemblies"; Jan. 1, 2017 (Jan. 1, 2017); pp. 1-54; XP055832323; Retrieved from the Internet:URL: https://media.digikey.com/pdf/Data%20Sheets/3M%20PDFs/Twin_Axial_Cable_Assem_Calalog.pdf.

* cited by examiner

FIG. 5

| FREQUENCY | NOTE | UNIT | 90° BENDING TO LONG AXIS DIRECTION (R=4 mm) | | | | | | 90° TWISTING (R = 4 mm) | | | | | |
|---|---|---|---|---|---|---|---|---|---|---|---|---|---|---|
| | | | 0 | 1 POINT | 2 POINTS | 3 POINTS | 4 POINTS | 5 POINTS | 0 | 1 POINT | 2 POINTS | 3 POINTS | 4 POINTS | 5 POINTS |
| 200MHz | ATTENUATION AMOUNT | dB/m | -0.3193 | -0.3232 | -0.3281 | -0.3205 | -0.3270 | -0.3283 | -0.3221 | -0.3222 | -0.3224 | -0.3230 | -0.3223 | -0.3235 |
| | CHANGE RATE | % | 0.0 | 1.2 | 2.7 | 0.3 | 2.4 | 2.8 | 0.0 | 0.0 | 0.1 | 0.3 | 0.1 | 0.4 |
| 2.5GHz | ATTENUATION AMOUNT | dB/m | -1.1580 | -1.2870 | -1.3159 | -1.3355 | -1.3861 | -1.4216 | -1.2340 | -1.2366 | -1.2340 | -1.2350 | -1.2380 | -1.2398 |
| | CHANGE RATE | % | 0.0 | 11.1 | 13.6 | 15.3 | 19.7 | 22.8 | 0.0 | 0.2 | 0.0 | 0.1 | 0.3 | 0.5 |
| 4GHz | ATTENUATION AMOUNT | dB/m | -1.6227 | -1.7615 | -1.7711 | -1.8630 | -1.9137 | -1.9266 | -1.6416 | -1.6446 | -1.6418 | -1.6408 | -1.6424 | -1.6471 |
| | CHANGE RATE | % | 0.0 | 8.5 | 9.1 | 14.8 | 17.9 | 18.7 | 0.0 | 0.2 | 0.0 | 0.0 | 0.1 | 0.3 |
| 6GHz | ATTENUATION AMOUNT | dB/m | -2.0726 | -2.2525 | -2.2768 | -2.3030 | -2.3530 | -2.3821 | -2.0601 | -2.0649 | -2.0601 | -2.0666 | -2.0635 | -2.0713 |
| | CHANGE RATE | % | 0.0 | 8.7 | 9.8 | 11.1 | 13.5 | 14.9 | 0.0 | 0.2 | 0.0 | 0.3 | 0.2 | 0.5 |

FIG. 8

| FREQUENCY | NOTE | UNIT | 90° TWISTING (R = 4 mm) | | | |
|---|---|---|---|---|---|---|
| | | | 0 | 5 POINTS | 10 POINTS | 15 POINTS |
| 200MHz | ATTENUATION AMOUNT | dB/m | −0.3085 | −0.3089 | −0.3092 | −0.3093 |
| | CHANGE RATE | % | 0.0 | 0.1 | 0.2 | 0.3 |
| 2.5GHz | ATTENUATION AMOUNT | dB/m | −1.2207 | −1.2233 | −1.2243 | −1.2260 |
| | CHANGE RATE | % | 0.0 | 0.2 | 0.3 | 0.4 |
| 4GHz | ATTENUATION AMOUNT | dB/m | −1.6416 | −1.6471 | −1.6495 | −1.6548 |
| | CHANGE RATE | % | 0.0 | 0.3 | 0.5 | 0.8 |
| 6GHz | ATTENUATION AMOUNT | dB/m | −2.0601 | −2.0713 | −2.0742 | −2.1026 |
| | CHANGE RATE | % | 0.0 | 0.5 | 0.7 | 2.1 |
| 8GHz | ATTENUATION AMOUNT | dB/m | −2.5016 | −2.5295 | −2.5488 | −2.6188 |
| | CHANGE RATE | % | 0.0 | 1.1 | 1.9 | 4.7 |
| 10GHz | ATTENUATION AMOUNT | dB/m | −2.9617 | −3.0259 | −3.0475 | −3.1445 |
| | CHANGE RATE | % | 0.0 | 2.2 | 2.9 | 6.2 |
| 12GHz | ATTENUATION AMOUNT | dB/m | −3.5016 | −3.3807 | −3.4071 | −3.4170 |
| | CHANGE RATE | % | 0.0 | −3.5 | −2.7 | −2.4 |
| 14GHz | ATTENUATION AMOUNT | dB/m | −4.5615 | −4.3658 | −4.4457 | −4.4622 |
| | CHANGE RATE | % | 0.0 | −4.3 | −2.5 | −2.2 |
| 16GHz | ATTENUATION AMOUNT | dB/m | −4.7635 | −5.0233 | −5.2278 | −5.7092 |
| | CHANGE RATE | % | 0.0 | 5.5 | 9.7 | 19.9 |
| 18GHz | ATTENUATION AMOUNT | dB/m | −4.9736 | −5.2246 | −5.2962 | −5.4418 |
| | CHANGE RATE | % | 0.0 | 5.0 | 6.5 | 9.4 |
| 20GHz | ATTENUATION AMOUNT | dB/m | −6.5281 | −6.5738 | −6.6857 | −6.7846 |
| | CHANGE RATE | % | 0.0 | 0.7 | 2.4 | 3.9 |
| 22GHz | ATTENUATION AMOUNT | dB/m | −7.0689 | −7.3652 | −7.6306 | −7.6919 |
| | CHANGE RATE | % | 0.0 | 4.2 | 7.9 | 8.8 |
| 24GHz | ATTENUATION AMOUNT | dB/m | −6.9388 | −7.1058 | −7.2797 | −7.2900 |
| | CHANGE RATE | % | 0.0 | 2.4 | 4.9 | 5.1 |
| 26GHz | ATTENUATION AMOUNT | dB/m | −9.6370 | −10.0573 | −10.3089 | −10.3617 |
| | CHANGE RATE | % | 0.0 | 4.4 | 7.0 | 7.5 |
| 26.5GHz | ATTENUATION AMOUNT | dB/m | −9.5661 | −10.0007 | −10.3941 | −10.4332 |
| | CHANGE RATE | % | 0.0 | 4.5 | 8.7 | 9.1 |

SHIELDED TWO-CORE ELECTRIC WIRE ROUTING STRUCTURE WHICH CAN BE REROUTED BY BENT-TWISTING THE ELECTRIC WIRE AT A NUMBER OF POINTS PER UNIT LENGTH

CROSS-REFERENCE TO RELATED APPLICATIONS

This application is based on Japanese Patent Applications No. 2018-132466 filed on Jul. 12, 2018, the entire contents of which are incorporated herein by reference.

BACKGROUND

1. Technical Field

The present invention relates to a routing structure of a two-core parallel shielded electric wire.

2. Background Art

In related art, a two-core parallel shielded electric wire is proposed in which, for example, two electric wires are arranged in parallel and a shield layer is provided around the two electric wires (for example, see JP-A-2012-133991 and JP-A-2015-185527). The two-core parallel shielded electric wire is known to be suitable for transmitting a signal in a high frequency range of 200 Mbps or more, as compared to a two-core twisted shielded electric wire in which two electric wires are spirally wound with each other.

In such a two-core parallel shielded electric wire, a metal foil tape or the like is used for the shield layer, but when the metal foil tape or the like is spirally wound on the two electric wires, a sudden increase in an attenuation amount (a sharp drop in transmission characteristics) occurs.

Therefore, in the two-core parallel shielded electric wire, the shield layer is proposed to be longitudinally attached to the two electric wires.

In the two-core parallel shielded electric wire described in JP-A-2012-133991 and JP-A-2015-1855272, due to a relationship in which the two electric wires are arranged in parallel, a long axis and a short axis are formed in a cross-sectional view, and transmission loss may increase due to a bending direction. That is, in the two-core parallel shielded electric wire, although the transmission loss due to bending in a short axis direction is small, a difference in strain applied to the two electric wires due to bending in a long axis direction increases, and the transmission loss increases.

Therefore, the two-core parallel shielded electric wire is preferably arranged only by bending in the short axis direction. However, in an actual routing environment (for example, routing in an automobile), bending in a space-saving manner is required, so that bending in the long axis direction is also required, resulting in increase in the transmission loss.

The invention has been made to solve such a problem in related art, and an object thereof is to provide a routing structure of a two-core parallel shielded electric wire capable of suppressing transmission loss due to bending.

SUMMARY OF THE INVENTION

According to an aspect of the invention, a routing structure of a two-core parallel shielded electric wire includes: two insulated electric wires that are arranged in parallel; and a shield layer that is attached around the two insulated electric wires and extends in a longitudinal direction of the two insulated electric wires.

In the routing structure, the two-core parallel shielded electric wire is rerouted by bent twisting the two-core parallel shielded electric wire in a short axis direction at a route change point along a long axis direction of the two-core parallel shielded electric wire, and the number of bent twisted points in the short axis direction is 1.43 or less per meter.

According to the routing structure of the two-core parallel shielded electric wire in the above aspect, the route is changed by bent twisting the two-core parallel shielded electrical wire in the short axis direction at the route change point along the long axis direction of the two-core parallel shielded electric wire, so that a decrease in transmission loss can be suppressed without bending the two-core parallel shielded electric wire in the long axis direction. Further, the number of bent twisted points in the short axis direction is 1.43 or less per meter in the two-core parallel shielded electric wire. Here, when the number of twisted points per unit length increases, the transmission loss may be 10% or more, and transmission characteristics may be greatly decreased. However, when the number is 1.43 or less per meter, the decrease in transmission loss can be suppressed to less than 10%. Therefore, the routing structure of the two-core parallel shielded electric wire can be provided in which the transmission loss due to bending is suppressed.

BRIEF DESCRIPTION OF THE DRAWINGS

FIG. 5 is a table showing details of the transmission characteristics shown in FIG. 4.

FIG. 6A shows bending in a long axis direction, and FIG. 6B shows bent twisting in a short axis direction.

FIG. 8 is a table showing details of the transmission characteristics shown in FIG. 7.

DETAILED DESCRIPTION OF THE EMBODIMENTS

Hereinafter, the invention will be described according to a preferred embodiment.

The invention is not limited to the embodiment described below, and can be appropriately modified without departing from the scope of the invention. In the embodiment described below, some configurations are not shown or described, but it goes without saying that a known or well-known technique is applied as appropriate to details of an omitted technique within a range in which no contradiction occurs to contents described below.

Figure 1:
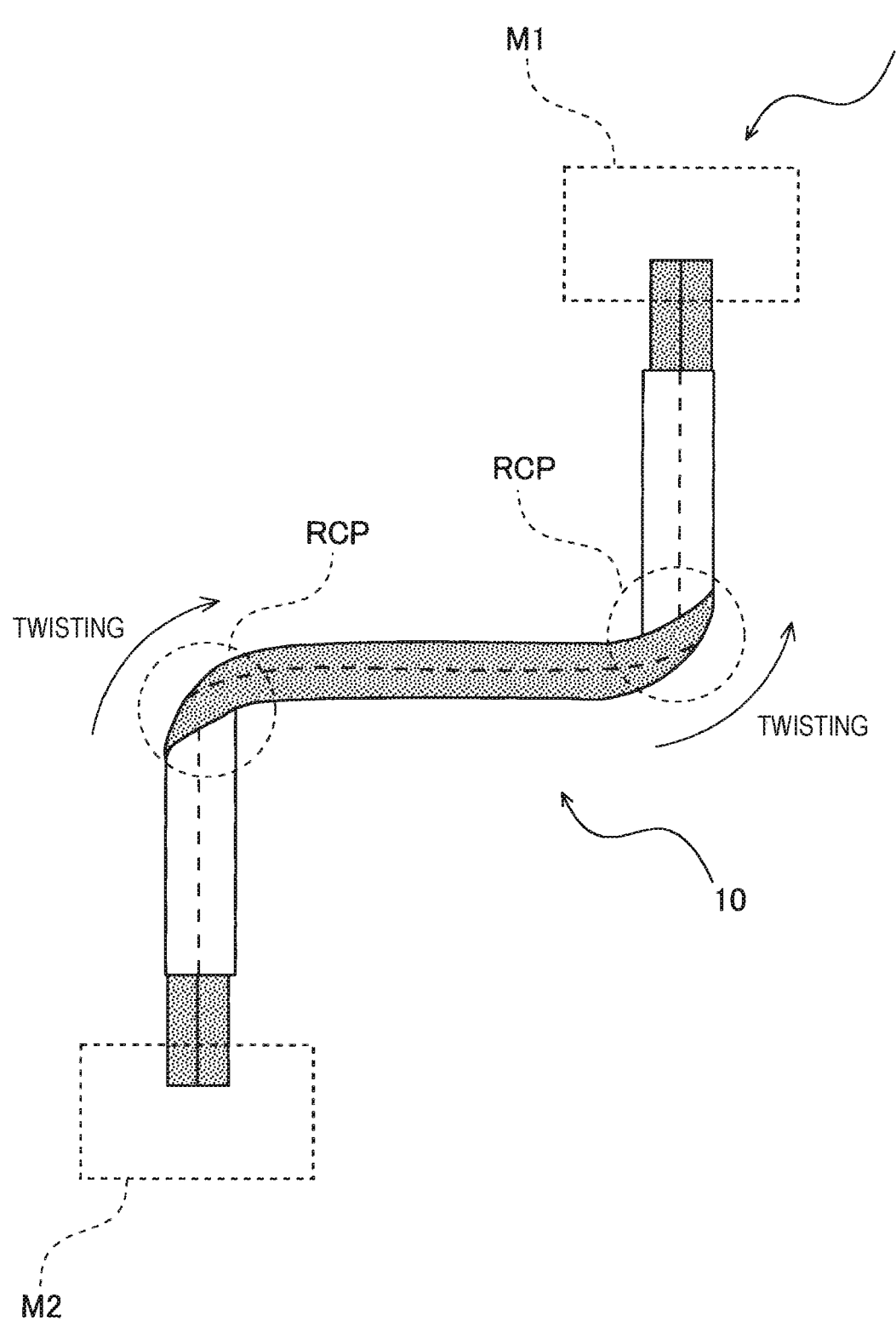
FIG. 1 is a top view showing a routing structure of a two-core parallel shielded electric wire according to an embodiment of the invention.

FIG. 1 is a top view showing a routing structure of a two-core parallel shielded electric wire according to an embodiment of the invention. As shown in FIG. 1, a routing structure 1 of a two-core parallel shielded electric wire 10 is a structure for routing the two-core parallel shielded electric wire 10 in a space-saving manner such as in a vehicle, which includes a first machine M1, a second machine M2 and the two-core parallel shielded electric wire 10.

The first machine M1 and the second machine M2 are machines that are mounted, for example, in a vehicle, and that transmit and receive signals of 200 MHz or more and 26.5 GHz or less. The two-core parallel shielded electric wire 10 is routed between the first machine M1 and the second machine M2. The first machine M1 and the second machine M2 transmit signals along two insulated electric wires described later (see reference numeral 11 in FIGS. 2 and 3). The signals are transmitted in phases that are opposite to each other. A reception side synthesizes and outputs a difference between received signals.

Figure 2:
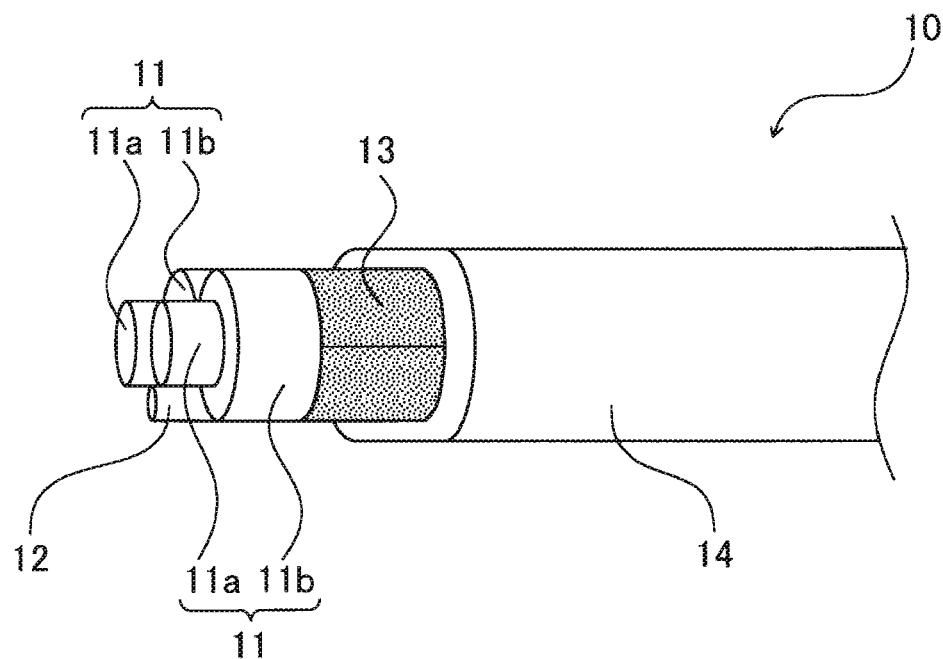
FIG. 2 is a perspective view showing the two-core parallel shielded electric wire shown in FIG. 1.
Figure 3:
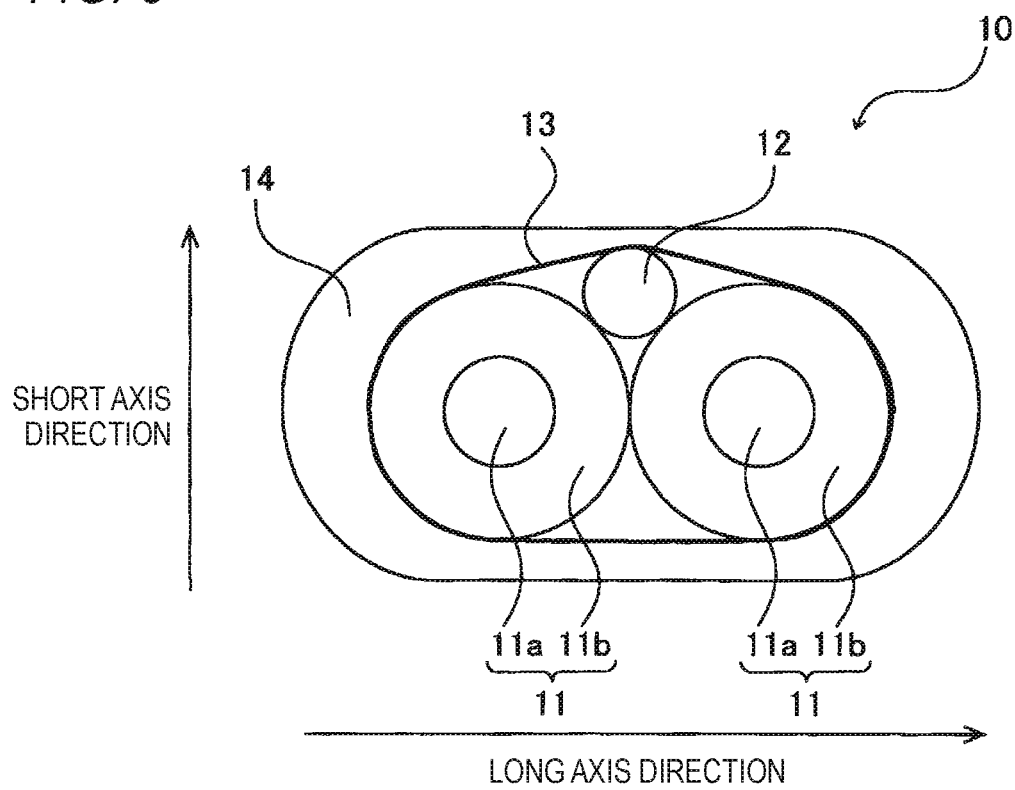
FIG. 3 is a cross-sectional view of the two-core parallel shielded electric wire shown in FIG. 1.

FIG. 2 is a perspective view showing the two-core parallel shielded electric wire 10 shown in FIG. 1, and FIG. 3 is a cross-sectional view of the two-core parallel shielded electric wire 10 shown in FIG. 1.

As shown in FIGS. 2 and 3, the two-core parallel shielded electric wire 10 is used to transmit a signal of 200 MHz or more and 26.5 GHz or less, and includes the two insulated electric wires 11, a drain wire 12, a shield layer 13 and an insulator 14.

The two insulated wires 11 are arranged side by side in parallel to each other, and each of the insulated electric wire 11 is formed of a conductor 11a covered with an insulator 11b. The conductor 11a is made of a conductive metal such as a soft copper wire, a copper alloy wire, a tin-plated soft copper wire, a tin-plated copper alloy wire, a silver-plated soft copper wire and a silver-plated copper alloy wire. The insulator 11b is made of PE (polyethylene), PP (polypropylene) or PTFE (polytetrafluoroethylene), or foamed PE, PP or PTFE.

The conductor 11a is formed of a single wire in an example shown in FIGS. 2 and 3, but is not limited thereto and may be formed of a stranded wire formed of a plurality of strands or the like. Each strand may be a plated fiber or the like. The shield layer 13 and the insulator 14 are provided on the two insulated wires 11. Therefore, as shown in FIG. 3, the two-core parallel shielded electric wire 10 has a substantially flat shape in cross section.

The drain wire 12 is a bare wire provided in contact with the shield layer 13, and includes an end connected to ground. The drain wire 12 is arranged, for example, at a portion serving as a gap between the two insulated wires 11. Similarly to the conductor 11a, the drain wire 12 is made of a conductive metal such as a soft copper wire, a copper alloy wire, a tin-plated soft copper wire, a tin-plated copper alloy wire, a silver-plated soft copper wire and a silver-plated copper alloy wire. The drain wire 12 is not limited to be arranged in the gap between the two insulated wires 11, and may be arranged at another portion. In addition, the drain wire 12 is not limited to a single wire, and may be formed of a stranded wire or the like.

The shield layer 13 is made of a resin tape to which a metal foil such as an aluminum foil or a copper foil is adhered, or a resin tape on which aluminum or copper is deposited, and is longitudinally attached on the two insulated wires 11 and the drain wire 12. These resin tapes are longitudinally attached such that metal surfaces thereof are inward and are brought into conduction with the drain wire 12. Therefore, external noise of the two-core parallel shielded electric wire 10 is grounded from the shield layer 13 through the drain wire 12.

The insulator 14 is an insulating resin that is extrusion-coated on the shield layer 13, and similarly to the insulator 11b, is made of PE, PP or PTFE, or foamed PE, PP or PTFE. Instead of the insulator 14, a resin film such as PET (polyethylene terephthalate) or PTFE may be wound on the shield layer 13.

Here, in the cross-sectional view shown in FIG. 3, the two-core parallel shielded electric wire 10 has a small transmission loss when bent in a short axis direction, but the transmission loss increases when bent in a long axis direction.

Therefore, in the routing structure 1 of the two-core parallel shielded electric wire 10 according to the embodiment as shown in FIG. 1, a route is changed by bent twisting the two-core parallel shielded electric wire 10 in the short axis direction at a route change point RCP along the long axis direction of the two-core parallel shielded electric wire 10. Accordingly, a decrease in transmission loss is suppressed without bending the two-core parallel shielded electric wire 10 in the long axis direction.

The twisted two-core parallel shielded electric wire 10 is tape-wound with another wire harness, or is connected to a vehicle body or the like by a clamp, thereby fixing the twisting.

In addition, the two-core parallel shielded electric wire 10 used in the routing structure 1 according to the embodiment includes 1.43 or less route change points RCP per meter (that is, the number/total length of the route change points RCP is 1.43 or less). Accordingly, the number of the route change points RCP per unit length is not increased, and a decrease in transmission characteristics can be suppressed to less than 10%. That is, when the number of the route change points RCP of the two-core parallel shielded electric wire 10 exceeds 1.43 per meter, the transmission loss may be decreased by 10% or more, and the transmission characteristics may be greatly decreased. However, when the number is 1.43 or less, the decrease in transmission loss can be suppressed to less than 10%.

Particularly, a total length of the two-core parallel shielded electric wire 10 is preferably 7 m or less, and the number of the route change points RCP is preferably 10 or less (two in FIG. 1). Here, when the total length is 7 m or less, influence on bending tends to be large compared with a case where the total length exceeds 7 m. Therefore, the decrease in transmission characteristics can be suppressed to less than 10% even when the influence is large, by setting the number of twisted points to be 10 or less when the total length is 7 m or less.

At least one of the route change points RCP is preferably rerouted by 90° or less when viewed along the short axis direction of the two-core parallel shielded electric wire 10 (that is, in a top view state shown in FIG. 1). In general, since a route change of 90° or less is a relatively gentle change, bending in the long axis direction is often. However, the present inventors have found that the route is preferable changed by bent twisting in the short axis direction in terms of transmission characteristics even with such relatively gentle bending. Therefore, the transmission loss can be further suppressed by changing the route by bent twisting in the short axis direction even when the route is changed by 90° or less.

Further, the two-core parallel shielded electric wire 10 preferably transmits a signal of 1 GHz or more. This is because the transmission loss increases in signals having a frequency range of 1 Ghz or more when the two-core parallel shielded electric wire 10 is bent in the long axis direction. That is, the decrease in transmission characteristics can be effectively suppressed by using the two-core parallel shielded electric wire 10 in this frequency range. Incidentally, the two-core parallel shielded electric wire 10 preferably transmits a signal of 1.5 GHz or more and 7 GHz or less, and more preferably transmits a signal of 2 GHz or more and 6 GHz or less. This is because the transmission loss increases in these frequency ranges.

Next, the transmission characteristics of the routing structure 1 of the two-core parallel shielded electric wire 10 according to the embodiment will be described with reference to FIGS. 4 to 8.

Figure 4:
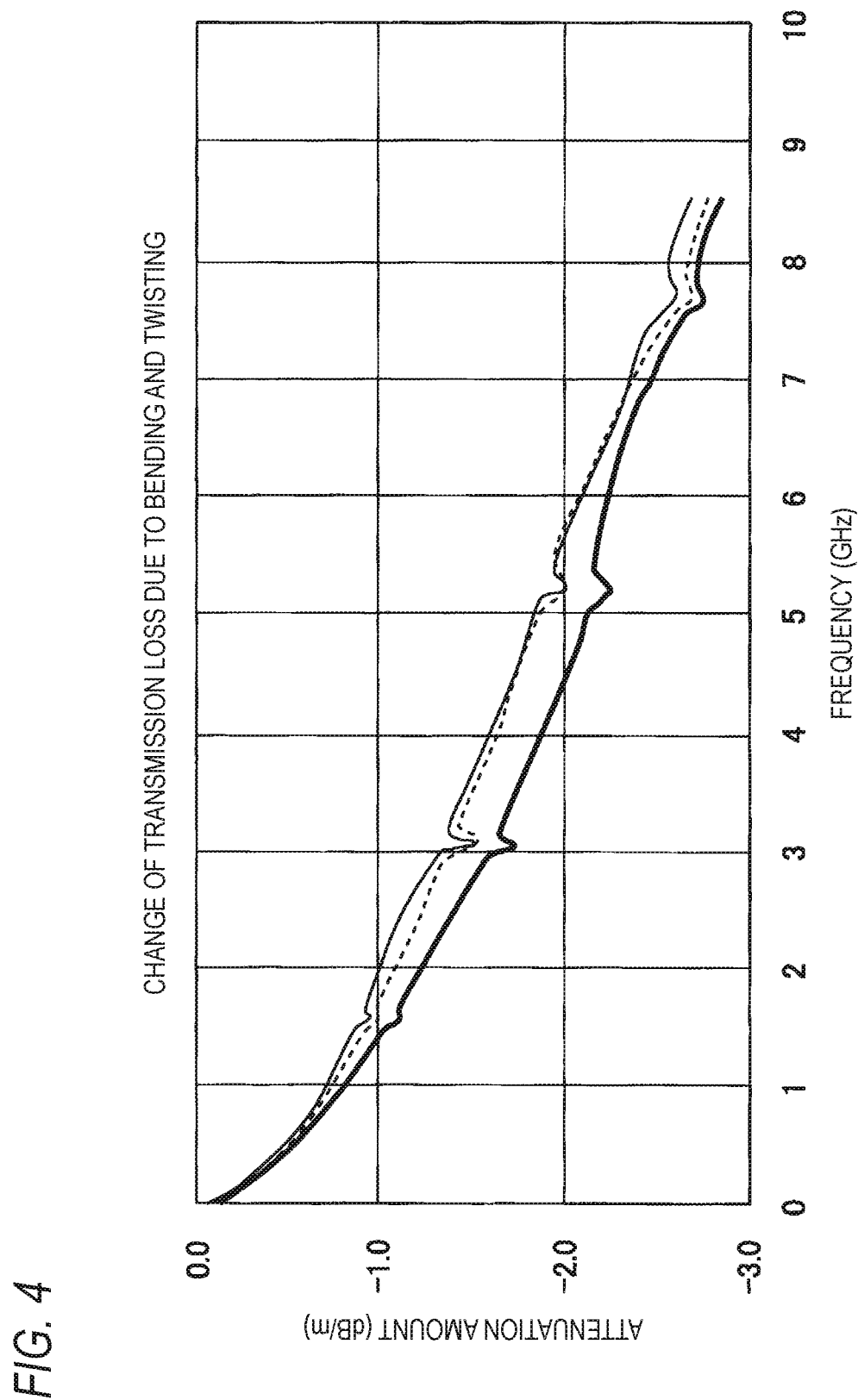
FIG. 4 is a first graph showing transmission characteristics of the two-core parallel shielded electric wire.
Figure 6A:
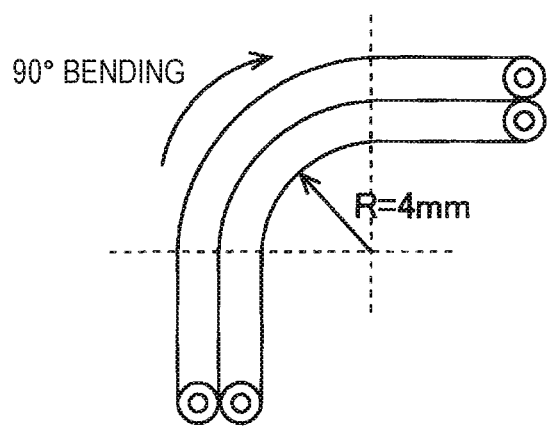
FIGS. 6A and 6B are top views showing a state of bending.
Figure 6B:
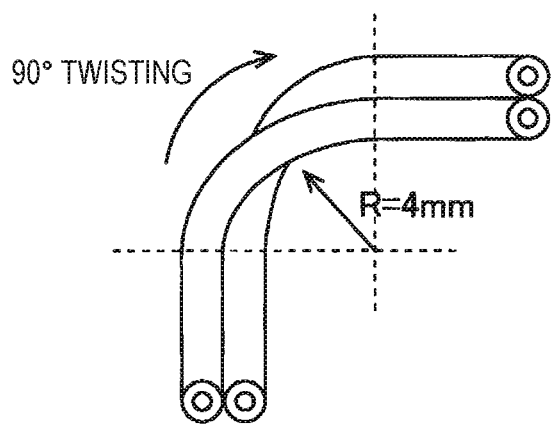

FIG. 4 is a first graph showing the transmission characteristics of the two-core parallel shielded electric wire 10, and FIG. 5 is a table showing details of the transmission characteristics shown in FIG. 4. FIG. 4 shows plots indicating a change of transmission loss due to bending and twisting, where the frequency (expressed as Ghz) is the abscissa and the attenuation amount (expressed as dB/m) is the ordinate. FIG. 5 shows a Table of attenuation amounts (expressed in dB/m) and change rate amounts (expressed as a percentage) for a plurality of different route change points RCP that are subject to bending at 90° to the long axis direction with a radius of 4 mm and a plurality of route change points RCP that are subject to twisting at 90° with a radius of 4 mm and for a plurality of different frequencies (expressed in Ghz). FIGS. 6A and 6B are top views showing a state of bending, FIG. 6A shows bending at 90° with a radius of 4 mm in the long axis direction, FIG. 6B shows bent twisting at 90° with a radius of 4 mm in the short axis direction.

The transmission characteristics shown in FIGS. 4 and 5 show results of measurement using the two-core parallel shielded electric wire 10 having a conductor size of AWG 24 and a length of 7 m. The transmission characteristics shown in FIG. 4 show the results of measurement of three cases: there is no bending, bending in the long axis direction (hereinafter simply referred to as "bending") shown in FIG. 6A or bent twisting through 90° in the short axis direction (hereinafter simply referred to as "twisting") shown in FIG. 6B, 5 bent points (R=4 mm) are provided, and 5 twisted points (R=4 mm) are provided. The transmission characteristics shown in the Table of FIG. 5 show respective attenuation amounts (expressed in dB/m) when 1 to 5 bent and twisted points are provided, and corresponding change rate amounts (expressed as a percentage of change as compared to a two-core parallel shielded electric wire 10 without bending and twisting, i.e., a wire 10 that is bent in the long axis direction), at frequencies of 200 MHz, 2.5 GHz, 4 GHz and 6 GHz.

First, as shown in FIG. 4, when 5 bent points are provided (see a thick line), the attenuation amount greatly increases with respect to a case where there is no bending and twisting (see a solid line), and when 5 twisted points are provided (see a broken line), an increase in the attenuation amount is smaller than that when 5 bent points are provided.

As shown in FIG. 5, when the number of bent or twisted points increases from 1 point to 5 points at frequencies of 200 MHz, 2.5 GHz, 4 GHz and 6 GHz, the respective change rate amounts (expressed in %) for the corresponding attenuation amounts (expressed in dB/m) increase. However, compared to the respective change rate amounts for the corresponding attenuation amounts due to bending (for example, bending at 90°), the change rate in the attenuation amount due to twisting (for example, twisting at 90°) is very small, and is smaller than the change rate of one bent point even if five twisted points are provided. Although not shown, the change rate in the attenuation amount due to twisting is also very small compared to the change rate in the attenuation amount due to bending similarly for a range over 8.5 GHz (26.5 GHz or less).

Figure 7:
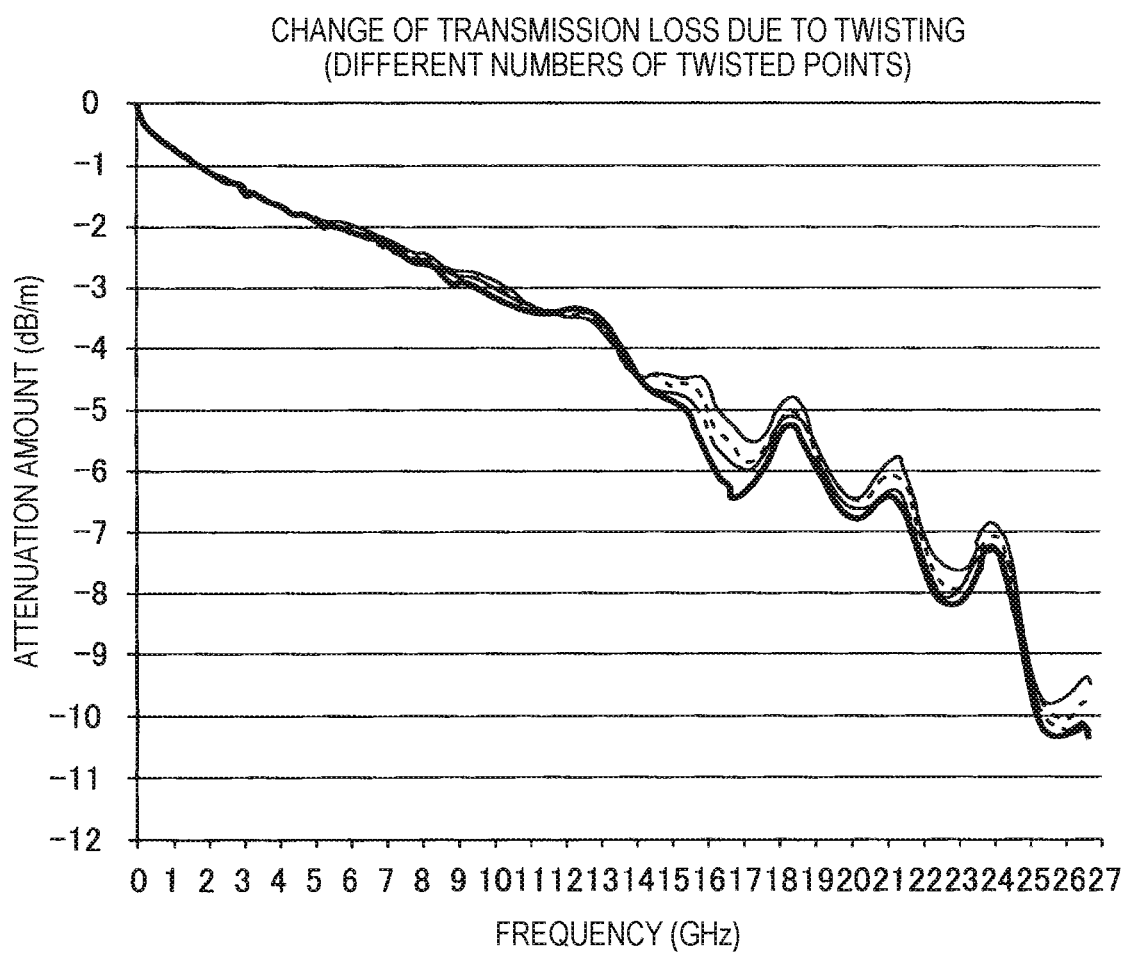
FIG. 7 is a second graph showing transmission characteristics of the two-core parallel shielded electric wire.

FIG. 7 is a second graph showing transmission characteristics of the two-core parallel shielded electric wire 10, and FIG. 8 is a table showing details of the transmission characteristics shown in FIG. 7. FIG. 7 shows plots of a change of transmission loss due to twisting for a different number of twisted points, where the frequency (expressed as Ghz) is the abscissa and the attenuation amount (expressed as dB/m) is the ordinate. FIG. 8 shows a Table of attenuation amounts (expressed in dB/m) and change rate amounts (expressed as a percentage) for a plurality of different route change points RCP that are subject to twisting at 90° with a radius of 4 mm and for a plurality of different frequencies (expressed in Ghz).

The transmission characteristics shown in FIGS. 7 and 8 show results of measurement using the two-core parallel shielded electric wire 10 having the conductor size of AWG 24 and the length of 7 m. The transmission characteristics shown in FIG. 7 show the results of measurement of four cases: there is no twisting, 4 twisted points are provided, 10 twisted points are provided, and 15 twisted points are provided. The transmission characteristics shown in the Table of FIG. 8 show respective attenuation amounts (i.e. in dB/m) when 5, 10 and 15 twisted points (R=4 mm) are provided, and corresponding change rate amounts (expressed as a percentage of change as compared to a two-core parallel shielded electric wire 10 without bending and twisting, i.e., a wire 10 that is bent in the long axis direction), at frequencies of 200 MHz, 2.5 GHz, 4 GHz, 6 GHz, 8 GHz, 10 GHz, 12 GHz, 14 GHz, 16 GHz, 18 GHz, 20 GHz, 22 GHz, 24 GHz, 26 GHz and 26.5 GHz.

As shown by a solid line (no twisted point), a broken line (5 twisted points), a dashed-dotted line (10 twisted points) and a thick line (15 twisted points) in FIG. 7, when the number of twisted points increases, the attenuation amount tends to increase. Here, when the number of twisted points is 15, the change rate is less than 10% at frequencies other than 16 GHz, but the change rate is 19.9% at 16 GHz, and the change rate of less than 10% cannot be achieved. On the other hand, when the number of twisted points is 10 at 16 GHz, the change rate is 9.7%, and the change rate of less than 10% can be achieved. These two change rate amounts are highlighted in the Table of FIG. 8 for convenience.

Therefore, in order to achieve a change rate of less than 10%, the number of twisted points is preferably 10 or less. If the number of twisted points is 5 or less, the change rate can be suppressed to 5.5% or less, which is more preferable.

In this way, according to the routing structure 1 of the two-core parallel shielded electric wire 10 according to the embodiment, the route is changed by bent twisting the two-core parallel shielded electrical wire 10 in the short axis direction at the route change point RCP along the long axis direction of the two-core parallel shielded electric wire 10, so that the decrease in transmission loss can be suppressed without bending the two-core parallel shielded electric wire 10 in the long axis direction, and the number of bent twisted points in the short axis direction is 1.43 or less per meter in the two-core parallel shielded electric wire 10. Here, when the number of twisted points per unit length increases, the transmission loss may be 10% or more, and the transmission characteristics may be greatly decreased. However, when the number is 1.43 or less per meter, the decrease in transmission loss can be suppressed to less than 10%. Therefore, the routing structure 1 of the two-core parallel shielded electric wire 10 can be provided in which the transmission loss due to bending is suppressed.

The total length is 7 m or less, and the number of bent twisted points in the short axis direction is 10 or less. Here, when the total length is 7 m or less, the influence on bending tends to be large compared with the case where the total length exceeds 7 m. Therefore, the decrease in transmission characteristics can be suppressed to less than 10% even when the influence is large, by setting the number of twisted points to be 10 or less when the total length is 7 m or less.

At least one of the twisted points is rerouted by 90° or less. Here, since the route change of 90° or less is a relatively gentle change, bending in the long axis direction often occurs. However, the present inventors have found that the route is preferable changed by bent twisting in the short axis direction in terms of transmission characteristics even with such relatively gentle bending. Therefore, the transmission loss can be further suppressed by changing the route by bent twisting in the short axis direction even when the route is changed by 90° or less.

Since routing is performed between the machines M1 and M2 that transmit signals of 1 GHz or more and 7 GHz or less, the invention is used in a frequency range where the transmission loss increases when there is bending in the long axis direction, and the decrease in transmission characteristics can be effectively suppressed.

Although the invention has been described above based on the embodiment, the invention is not limited to the above embodiment, and modifications may be made or well-known techniques may be combined without departing from the scope of the invention.

For example, although the drain wire 12 is a bare wire in the embodiment, but is not limited thereto, and may be formed of an insulated wire coated with an insulator.

What is claimed is:

1. A routing structure of a two-core parallel shielded electric wire comprising:
   two insulated electric wires that are arranged in parallel; and
   a shield layer that is attached around the two insulated electric wires and extends in a long axis direction of the two insulated electric wires,
   wherein the two-core parallel shielded electric wire is rerouted by bent-twisting the two-core parallel shielded electric wire in a short axis direction of the two insulated electric wires at a route change point in the long axis direction of the two-core parallel shielded electric wire, and the number of bent-twisted points per unit length of the insulated electric wires is less than or equal to 1.43 bent-twisted points per meter.

2. The routing structure of the two-core parallel shielded electric wire according to claim 1, wherein
   the number of the bent-twisted points in the short axis direction is 10 or less.

3. The routing structure of the two-core parallel shielded electric wire according to claim 1, wherein
   at least one of the bent-twisted points in the short axis direction is rerouted by 90° or less when viewed along the short axis direction of the two-core parallel shielded electric wire.

4. The routing structure of the two-core parallel shielded electric wire according to claim 1, wherein
   the two-core parallel shielded electric wire is routed between machines that transmit signals of 1 GHz or more.

* * * * *